(12) United States Patent
Nelson et al.

(10) Patent No.: US 6,361,840 B2
(45) Date of Patent: Mar. 26, 2002

(54) INJECTION MOLDED, RIGIDIZED BLADDER WITH VARYING WALL THICKNESS FOR MANUFACTURING COMPOSITE SHAFTS

(76) Inventors: Ronald H. Nelson, 4210 S. Monarch Way, Salt Lake City, UT (US) 84124; Dimitrije Milovich, 475 8th Ave., Salt Lake City, UT (US) 84103

( * ) Notice: Subject to any disclaimer, the term of this patent is extended or adjusted under 35 U.S.C. 154(b) by 0 days.

(21) Appl. No.: 09/333,723

(22) Filed: Jun. 15, 1999

Related U.S. Application Data

(62) Division of application No. 08/629,525, filed on Apr. 9, 1996, now Pat. No. 6,143,236, which is a continuation of application No. 08/195,461, filed on Feb. 9, 1994, now Pat. No. 5,543,203.

(51) Int. Cl.$^7$ .............................. B28B 7/32; B29D 23/00
(52) U.S. Cl. .................... 428/35.2; 428/35.5; 156/156; 156/285; 264/314; 473/316; 473/323
(58) Field of Search ............................. 428/35.2, 35.5; 264/516, 257, 258, 314; 156/156, 285, 194, 287; 473/316, 318, 323

(56) References Cited

U.S. PATENT DOCUMENTS

| | | | |
|---|---|---|---|
| 4,124,678 A | 11/1978 | Stroupe | 264/314 |
| 4,397,048 A | 8/1983 | Brown et al. | 3/2 |
| 4,575,447 A | 3/1986 | Hariguchi | 264/516 |
| 4,581,190 A | 4/1986 | Nagamoto et al. | 264/136 |
| 4,759,893 A | 7/1988 | Krauter | 264/258 |
| 4,808,362 A | 2/1989 | Freeman | 264/257 |
| 4,828,781 A | 5/1989 | Duplessis et al. | 264/250 |
| 4,850,607 A | 7/1989 | Trimble | 280/281.1 |
| 4,889,355 A | 12/1989 | Trimble | 280/281.1 |
| 4,902,458 A | 2/1990 | Trimble | 264/46.6 |
| 4,931,247 A | 6/1990 | Yeh | 264/258 |
| 4,986,949 A | * 1/1991 | Trimble | 264/258 |
| 5,071,506 A | 12/1991 | Nelson et al. | 264/314 |
| 5,076,601 A | * 12/1991 | Duplessis | 280/28.1 |
| 5,143,665 A | * 9/1992 | Clubbs et al. | 264/221 |
| 5,156,786 A | * 10/1992 | Monroe | 264/112 |
| 5,207,964 A | * 5/1993 | Mauro | 264/221 |
| 5,314,653 A | * 5/1994 | Haralambopoulos | 264/301 |
| 5,318,742 A | * 6/1994 | You | 264/516 |
| 5,328,176 A | * 7/1994 | Lo | 273/167 H |
| 5,350,556 A | * 9/1994 | Abe et al. | 264/248 |
| 5,368,804 A | * 11/1994 | Hwang et al. | 264/258 |
| 5,505,492 A | * 4/1996 | Nelson et al. | 280/819 |
| 5,544,907 A | 8/1996 | Lin et al. | 280/288.3 |
| 5,624,519 A | 4/1997 | Nelson et al. | 156/245 |
| 5,716,291 A | 2/1998 | Morell et al. | 264/314 |
| 5,759,112 A | 6/1998 | Morell et al. | 473/316 |
| 5,803,476 A | 9/1998 | Olson et al. | 280/281.1 |
| 5,814,268 A | 9/1998 | Banchelin et al. | 264/314 |

FOREIGN PATENT DOCUMENTS

| | | |
|---|---|---|
| GB | 2250 443 B | 6/1992 |
| JP | 3034-870 | 12/1978 |

\* cited by examiner

*Primary Examiner*—Rena L. Dye
(74) *Attorney, Agent, or Firm*—James L. Sonntag

(57) ABSTRACT

A pressurizable bladder for the manufacture of a composite shaft manufactured from a flexible elastomeric material and adapted for supporting at least one layer of fiber impregnated with resin has an opening for pressurization of the bladder to compress the impregnated fiber against female tooling while the tooling is heated to cure the resin. The bladder has a wall of variable thickness to permit outer contours of the bladder to conform to inner contours of the female tooling.

9 Claims, 15 Drawing Sheets

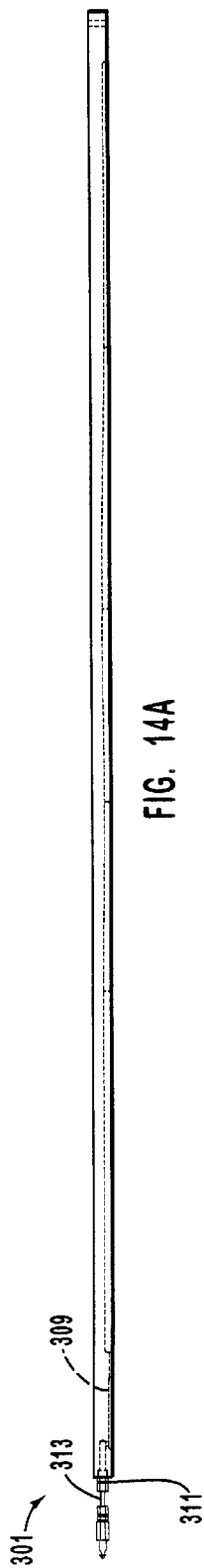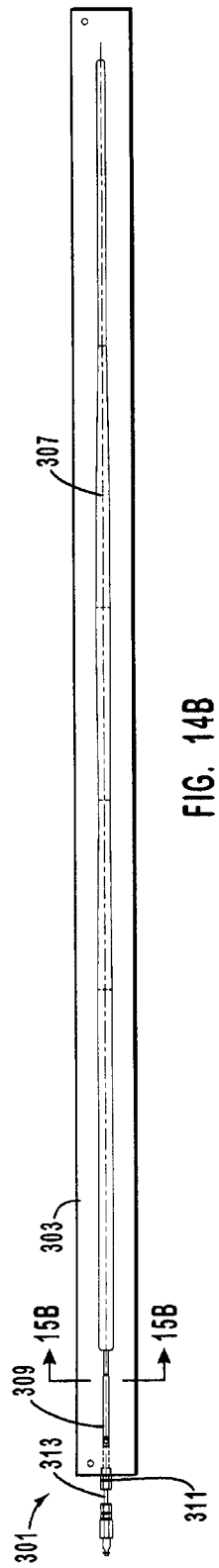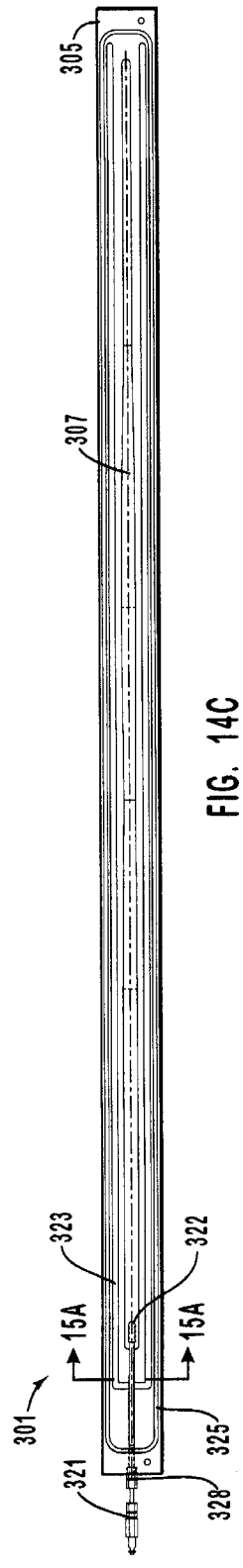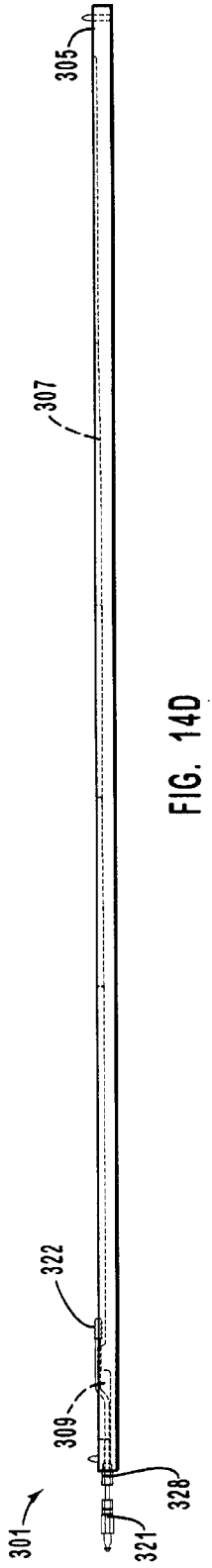

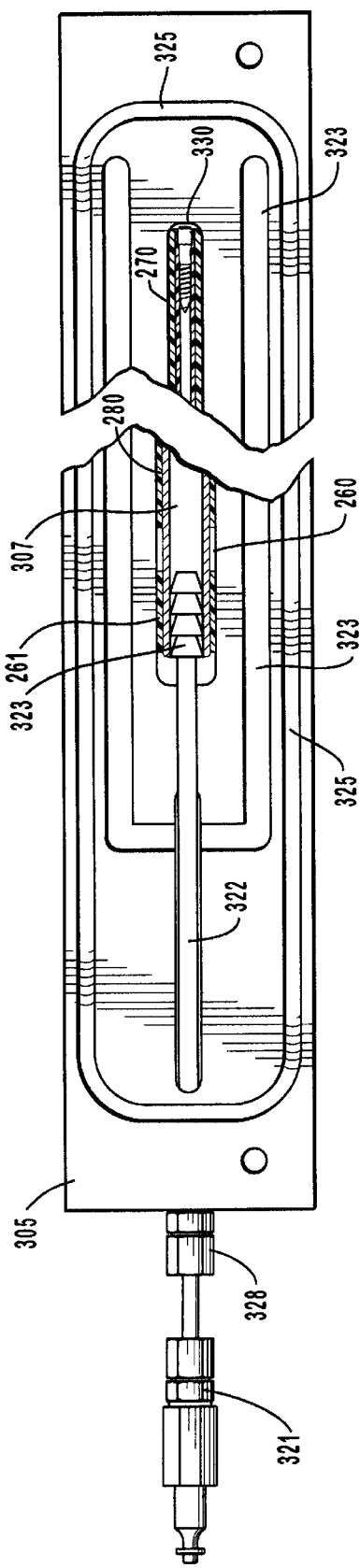
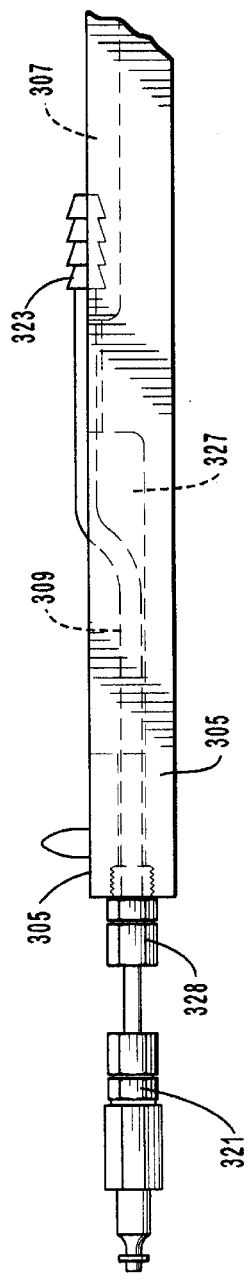
FIG. 16
FIG. 16A ated Jul. 9, 1996.

INJECTION MOLDED, RIGIDIZED BLADDER WITH VARYING WALL THICKNESS FOR MANUFACTURING COMPOSITE SHAFTS

RELATED APPLICATIONS

This application is a Divisional of Ser. No. 08/629,525, filed Apr. 9, 1996, now U.S. Pat. No. 6,143,236, which is a Continuation from U.S. patent application Ser. No. 08/195,461, filed Feb. 9, 1994, now U.S. Pat. No. 5,534,203, issued Jul. 9, 1996.

STATEMENT REGARDING FEDERALLY SPONSORED RESEARCH OR DEVELOPMENT (Not applicable)

FIELD OF THE INVENTION

This invention relates to the manufacture of golf club shafts and other shafts and poles from fiber/resin composite material.

BACKGROUND OF THE INVENTION

A common method for forming golf shafts from fiber/resin composite materials is to wrap fiber impregnated fiber around hard tooling in the form of a mandrel which defines the interior dimensions of the shaft. The fiber is compacted during the winding, by using, for example, rolling tables, and pressure may also be applied by a shrinkable tape wrapped around the mandrel. The advantage of these systems is that the shape and dimensions of uncured resin/fiber preform as it is wound or formed on the mandrel closely approximate the final product. There is little movement of the fiber during cure of the composite, thus the positions of the reinforcing fibers can well be controlled. However, these methods have the disadvantage that only low compaction pressures can only be applied if oven cure of the composite is used. Pressures can be applied using autoclave equipment, but this is not economically feasible for most applications. High compaction pressures are required to form high performance composites that are of light weight but have high strength. In addition, since the tooling must be removable after curing of the part, complex profiles which would trap the rigid interior mandrel pieces cannot be made with this method. Accordingly, this method is limits the shafts to lower structural performance, since the composite is made with low compaction pressure, and this method is also limited to relatively simple tapered shapes.

Another approach is disclosed in French patent applications 90 15387 and 90 15388. In this method a bladder is formed upon a hard metal mandrel. Resin impregnated fiber is formed around the bladder and the assembly placed into female tooling. The bladder is inflated at the base of the mandrel to expand the impregnated fiber into the tooling. This method has several disadvantages. The method disclosed is limited to shapes where the rigid mandrel can be removed from the cured part, i.e., is not trapped by the profile of shape of the part. Conversely, the impregnated fiber material in the preform would have to move substantially from its initial as formed or rolled shape to form a complex shape, which would likely displace the fibers and possibly compromise the properties of the final part. In addition, creation of a complex shape with, for example, a bulge would have entrances precluding removal of a rigid mandrel. Furthermore, the bladder used in this process is a thin walled latex rubber material formed by dipping the mandrel. Accordingly, the bladder necessarily is thin walled and has essentially the shape of the mandrel. In addition, the bladder such a bladder would not be durable and be capable of repeated use. The process of the French patent application also necessarily leaves the rigid metal mandrel inside the part during cure. This has the disadvantage of substantially slowing the rates of heat up and cool down during cure, because the large thermal mass of the metallic mandrel is thermally insulated by the relatively low conductivity composite material. Also, a large number of rigid mandrels are needed to flow through the entire bladder fabrication, shaft fabrication process, substantially increasing capital equipment costs.

BRIEF SUMMARY OF THE INVENTION

The present process involves an improvement of the process disclosed in U.S. Pat. No. 5,534,203, issued Jul. 9, 1996, which is hereby incorporated by reference. In this method plastic laminates are laid up around an inflatable bladder and placed in a female mold. The bladder inflates to compact the laminates to substantially eliminate voids and form a smooth, hollow shaft with a structurally strong and stiff skin. The outer dimensions of the shaft are defined by the dimensions of the female mold. This manufacturing process can generally be referred to as a "molding process" or the shafts can be referred to as "molded shafts". A particular advantage of this system is that since there is no internal mandrel that must be removed, complex shapes can be formed. In addition, the compression from the bladder is significantly higher that in fixed mandrel processes, which significantly improves the properties of the final part. However, a problem with this process, particular in the formation of golf shafts, is that the movement of the impregnated fiber from inflation of the bladder can displace the fiber sufficiently to compromise the properties of the cured part.

In the present process, the advantages of the molding process are retained while minimizing the movement of impregnated fiber during inflation of the bladder. Thus, the advantages of the molding process are combined with the advantages of fixed internal mandrel processes.

The advantages of the present invention are provided by providing an inflatable bladder that functions as a mandrel in that it is used to form a preform with the same approximate dimensions of the final part. The bladder is dimensioned so that any expansion of the bladder and the preform is minimized when the bladder is pressurized to compress the preform against the female tooling. The preform must only be slightly smaller than the inner dimensions of the female tooling to permit insertion of the bladder and preform into the tooling.

By forming the preform around a bladder that closely defines the shape of the final part, the advantages of the fixed mandrel process is achieved, since there is little movement of the fiber during the subsequent curing process. Since, there is no hard mandrel that has to be removed, but a flexible bladder, complex profiles of the shaft can be achieved and the shafts of the invention are not limited to simple tapers.

The invention can be viewed as the formation of a preform around a pressurizable rubber mandrel, the mandrel providing both the way to closely defined the shape of the preform to the final shape as well as provide the way for compressing the preform against female tooling that defines the outer dimensions of the part. Thus, the bladder, functioning as a mandrel, provides the advantage avoiding material fiber displacement by defining the preform shape to closely correspond to the final shape, but since the bladder is of a flexible material it can be removed from shafts having complex profiles. The bladder also has the function of providing a compressive force to compress the preform during curing, by pressing the preform against female tooling. Since the preform need only be slightly smaller to enable placement of the preform in the female tooling, only minimum expansion of the preform results from the pressurization, with little or no displacement of fiber. In preferred practice, a rigidizer, in the form of metal mandrel is inserted in the shaped elastomeric bladder of nonuniform wall thickness, to provide a more or less rigid substrate for preform construction. The rigid interior mandrel has conical shape with gradual, continuous, and perhaps varying rates of taper down its length, which allow it to be easily extracted after preformed construction and before cure.

The invention is basically a dual function molding tool, a shaped bladder of nonuniform wall thickness which (1) serves as a dimensional template like a mandrel in the formation of the preform, and (2) a systems for compressing the preform to provide for a high-performance composite material. Furthermore, the shaped elastomeric bladder with non-uniform wall thickness can be easily removed from interior spaces which would trap a rigid mandrel. The removal of the shaped elastomeric bladder from a trapped shape is achieved by pulling on, and thereby stretching the bladder to a smaller diameter. In contrast, rigid tooling that would be removable would be of a segmented multipiece design, which would not be economical or practical.

The invention allows for manufacture of shafts of varying diameter where, (1) the preform is dimensioned closely to final dimensions of the shaft, and (2) the shaft may have a "trapped shape." A trapped shape is a waste or bulge along the length of the shaft that would render removal of a hard metal interior mandrel impossible, e.g. where a middle portion of the shaft has a diameter larger or smaller than adjacent portions above and below. Traditional hard interior hard mandrel methods cannot be used to form trapped-shape shafts. Molding methods with interior bladders can be used for trapped shapes but these methods cannot form shafts where the preform is closely dimensioned to the final the final shape. Accordingly, there must be significant movement of the preform when the bladder is inflated. The present invention is able to combine the advantages of both systems by providing a pressurized bladder that functions as a mandrel to shape the preform, but is flexible enough to be removed from trapped-shaped shafts.

In practice, the golf shafts of the invention have a will thickness of about 0.02 inches to about 0.09. The outer dimensions of the bladder are only slightly smaller than the inner dimensions of golf shaft, about ⅓ of the wall thickness of the shaft or about 10 to 20 thousandths of the an inch.

The shafts of the invention are made from conventional impregnated fibers, such as carbon, graphite, fiberglass, KEVLAR™ polyamide, and boron fibers. The fibers are impregnated with any of various thermoplastic and thermosetting resins, and can be formed into hardened fiber reinforced shapes. Preferably, the shafts of the invention are made from carbon or graphite impregnated with epoxy resins. Fiber preimpregnated with resin, i.e., "prepreg," is commercially available, or fibers may be impregnated with suitable resins.

The process of the invention is particularly applicable to the manufacture of golf shafts that are circular in cross-section and are essentially radially uniform with respect to flexural properties. The shafts can be of complex shape, however, along the longitudinal axis, and is adapted to for making composite shafts that are narrow waisted, or have bulges along its length, as the so-called "bubble-shafts," as disclosed, for example, in U.S. Pat. No. 5,692,675, issued Dec. 2, 1997, which is hereby incorporated herein by reference. The process of the invention is also applicable to the manufacture of composite shafts or poles that have a straight longitudinal axis. The method of the invention is particularly advantageous in forming high-performance composite shafts made with high compaction pressures and high fiber volumes, and shafts that have a variable profile along their length.

Referring to FIG. 1, which a generalized flow sheet of the process of the invention, the bladder is preformed, preferably by molding, with dimensions approximating the final composite part, as described elsewhere. The bladder must also be formed with an internal cavity so that it can be pressurized. Any suitable method for manufacture may be used. A preferred method is to mold the bladder around a tapered mandrel that is removed after molding to form a generally tubular form, and sealing one end to form an pressurizable bladder.

The bladder is preferably of an elastomeric, heat-resistant material, such as silicone rubber. The bladder is required to expand but very little when the bladder is pressurized to compress the impregnated fiber against the female tooling, but it must also be stretched and removed from the interior of the finished cured part. Preferably, the bladder is heat-resistant and durable to allow to be used for the manufacture of several composite shafts.

Bladder pressures between 200 psi to 250 psi are commonly used, with pressures up to 350 psi also easily used.

Preimpregnated fiber is formed around the bladder to form a preform closely dimensioned to the final shaft dimensions. Accordingly, the preform is tightly wound, as much as practically possible. Since the preform must be capable of being placed in a female mold, it is made slightly smaller than the final shaft, and having the preform tightly made will decreased the amount that it will have to be displaced by pressurization of the bladder. To assist in applying or rolling the preimpregnated fiber around the bladder, a rolling mandrel is preferably inserted into the cavity of the mandrel to stiffen or rigidize the bladder. The rigid internal rolling mandrel has essentially the same dimensions as the mandrel used to form the inner surface in the bladder during injection molding of the bladder. It is slightly smaller (about 2.5%) to compensate for shrinkage of the elastomeric bladder material as it cures. Correspondingly, the entire bladder-molding tool, and center mandrel are oversized, about 2.5% relative to the desired final dimensions of the bladder.

After the preform is formed around the bladder, the rolling mandrel is removed, and the assembly of the bladder and preform is placed into a female mold. The preform is dimensioned slightly smaller to enable placement in the mold and closure of the mold without pinching of fiber between the mold parts, i.e., to prevent the formation of fiber flash. The amount in which the preform is dimensioned smaller than the mold is preferably as small as practical.

The mold is then closed, and the bladder is pressurized to compress the impregnated fiber against the interior surface of the mold. A vacuum will also typically be applied after the mold is closed and before the bladder is pressurized. The mold is heated to cure or hardened the impregnating resin and to form a hard fiber-reinforced composite. After curing the mold is opened and the finished shaft is removed. Any flash from leakage of the resin between the mold parts is then scraped off. The pressurization and cure times are chosen depending upon the resin/fiber used and the properties required for the part.

BRIEF DESCRIPTION OF THE DRAWINGS

FIGS. 14A to 14D are views of the shaft-molding tool.

FIG. 16 is an illustration showing each end of the mold with the assembly of bladder and prepreg placed in the mold.

FIG. 16A is a view of the shaft-molding toll shown in 14D and 14C, at the fitting end.

DETAILED DESCRIPTION OF THE INVENTION

Manufacture of Shaped Bladder

Figure 1:
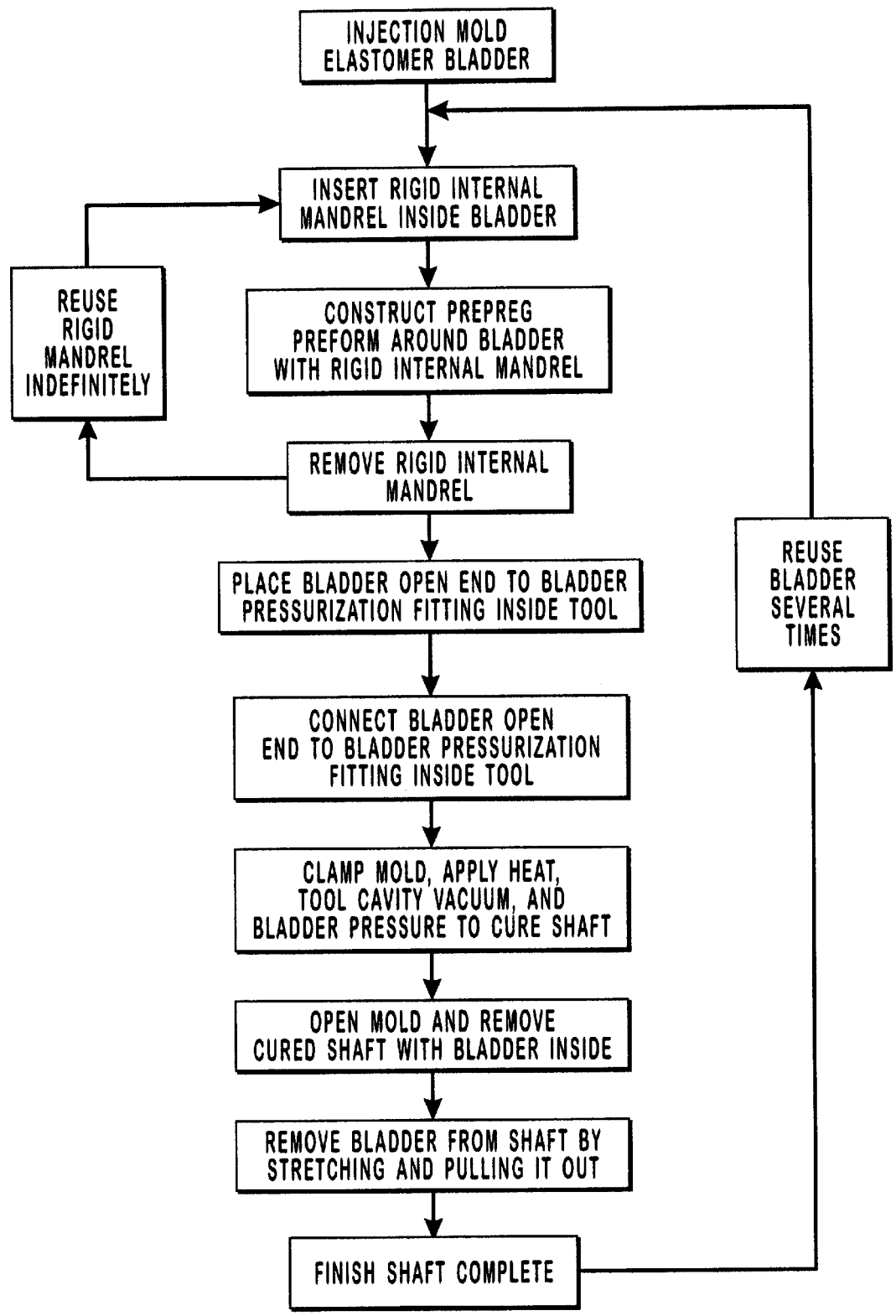
FIG. 1 is a block diagram illustrating the shaft manufacturing process.
Figure 2A:
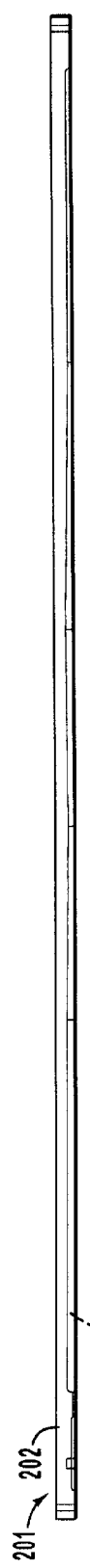
FIGS. 2A to 2D are views of the bladder injection tool.
Figure 2B:
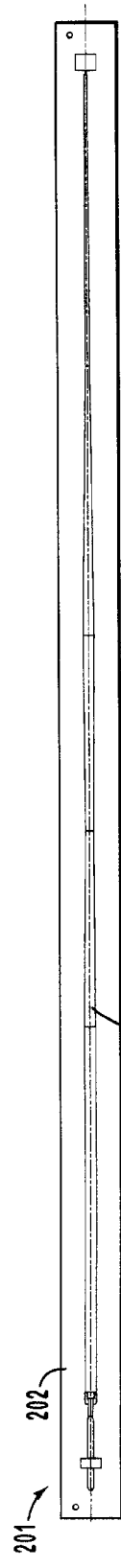

FIGS. 2A to 2D illustrate an injection mold for the injection molding of the bladder. FIGS. 2A, and 2B illustrate the top, 2C and 2D illustrate the bottom. The mold top 202, seen from the side, and the bottom mold-cavity side 2A, and 2B, respectively. The top of the molding tool 201 is shown with top portion of a molding cavity 205. The molding cavity comprises a main mold cavity 207, flow conduits 209 for flow of uncured elastomeric resin into the mold, inlet conduit.

Figure 2C:
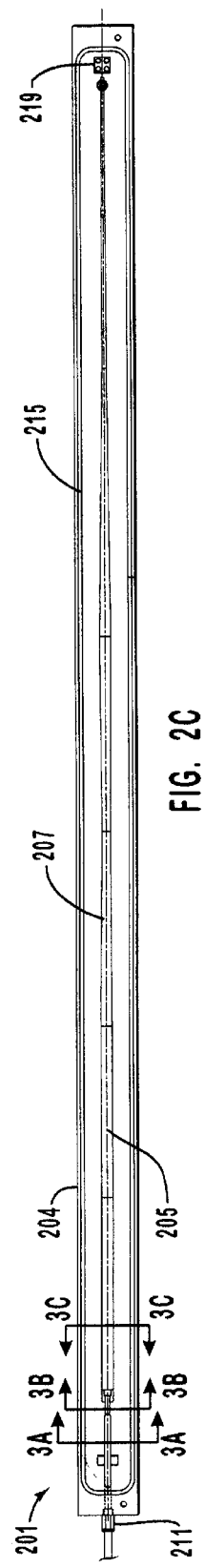
Figure 2D:
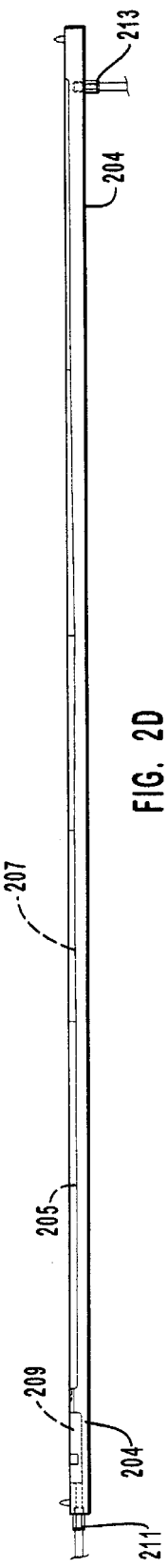

The bottom 204, seen from the side, the top mold-cavity side, and the end, in FIGS. 2C, and 2D, respectively, includes bottom portion of the main mold cavity 207, with appropriate flow conduits 209, an inlet conduit or injection port 211, and outlet conduit or vacuum port 213. An O-ring groove is provided to accommodate an O-ring to provide a vacuum seal between the top and bottom of the mold during the molding process.

Figure 3A:
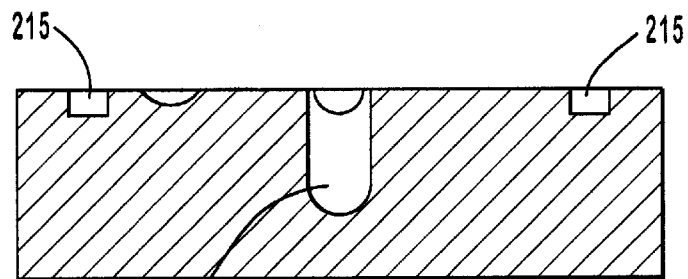
FIGS. 3A to 3C are cross-sections of the bladder injection tool shown in FIGS. 2A to 2D.
Figure 3B:
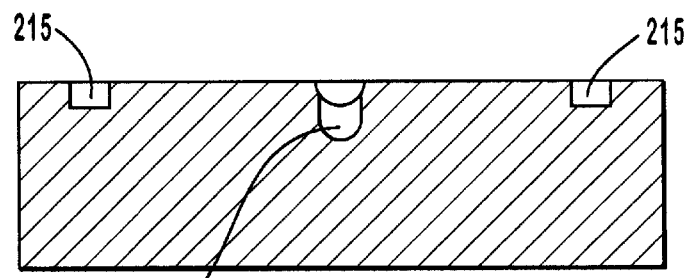
Figure 3C:
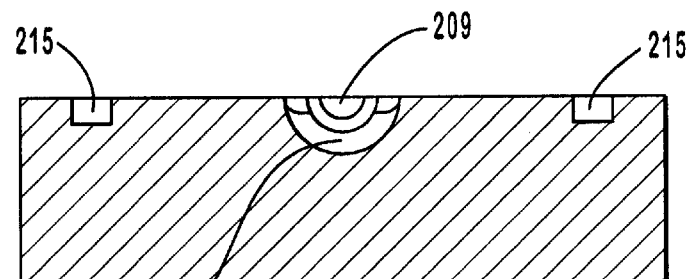

The cross-sectional view in FIG. 3A, which is a cross-section through A—A in FIG. 2C, shows the O-ring groove 215 and flow conduit 209. The cross-sectional view in FIG. 3B, which is a cross-section of top mold, B—B in FIG. 2C, shows the flow conduits 209 and threaded connector rod 223. The cross-sectional view in FIG. 3C, which is a cross-sectional view through the bottom of the mold, C—C in FIG. 2C, show the O-ring grooves, the lower half of the main mold cavity 207.

Figure 4:
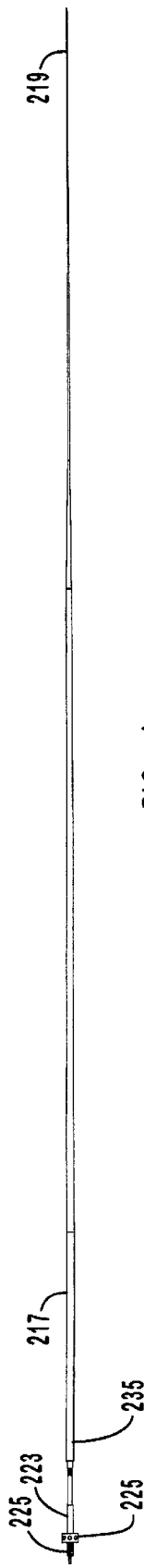
FIG. 4 is an illustration of the central mandrel of the bladder injection tool.
Figure 5:
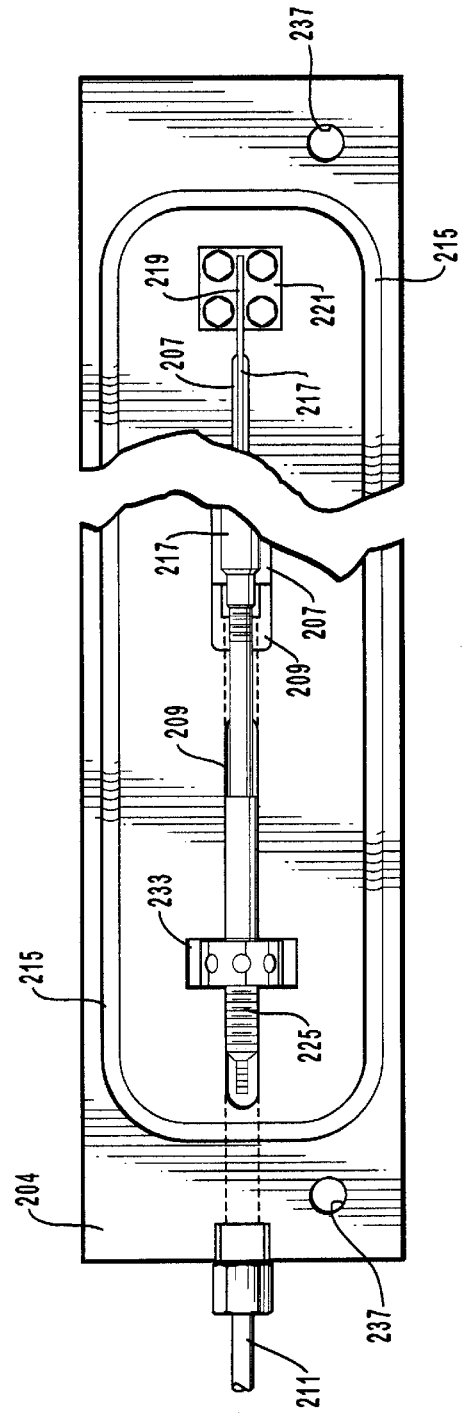
FIG. 5 is view of the central mandrel in the bladder injection-molding tool, showing particularly the ends.

The bladder as molded is generally tubular, which is accomplished by placing a mandrel 217 that extends through the center of the main mold cavity 207A. The mandrel is illustrated in FIGS. 4 and 5. For the molding process, a threaded connector rod 223 is attached to the proximal end 235 of the mandrel 217. The connector rod 223 comprises an adjustment nut 225 screwed on threads 227 of the connector rod. The connector rod 223 is attached to the proximal end 235 of the mandrel 217 by a threaded end 229 screwed into a threaded hole 231.

Referring to also to FIG. 5, which is a detail view of the ends of the bottom of the mold in FIG. 2D, the mandrel 217 is placed in the bottom portion of the mold. The distal end of the mandrel 219 is clamped by screw clamps 221 and the adjustment nut 225 is placed in a nut cavity 233. The mandrel is tensioned by turning of the adjustment nut 225, which is retained in the nut cavity 233. The tensioning of the mandrel 217 maintains the mandrel along the central axis 236 of the main mold cavity 207, so that the finished bladder will be radially symmetrical.

After the mandrel 217 is clamped and tensioned in the bottom portion 204 of the mold, and O-ring is placed in the O-ring grooves 215, the mold is closed by aligning and closing the top mold half 204 over the bottom mold half 202, using aligning pins 237 and aligning holes 239. Before closing the mandrel 217 and the mold cavities 207, 209 are preferably coated with an appropriate release agent, such as boron nitride.

Figure 6:
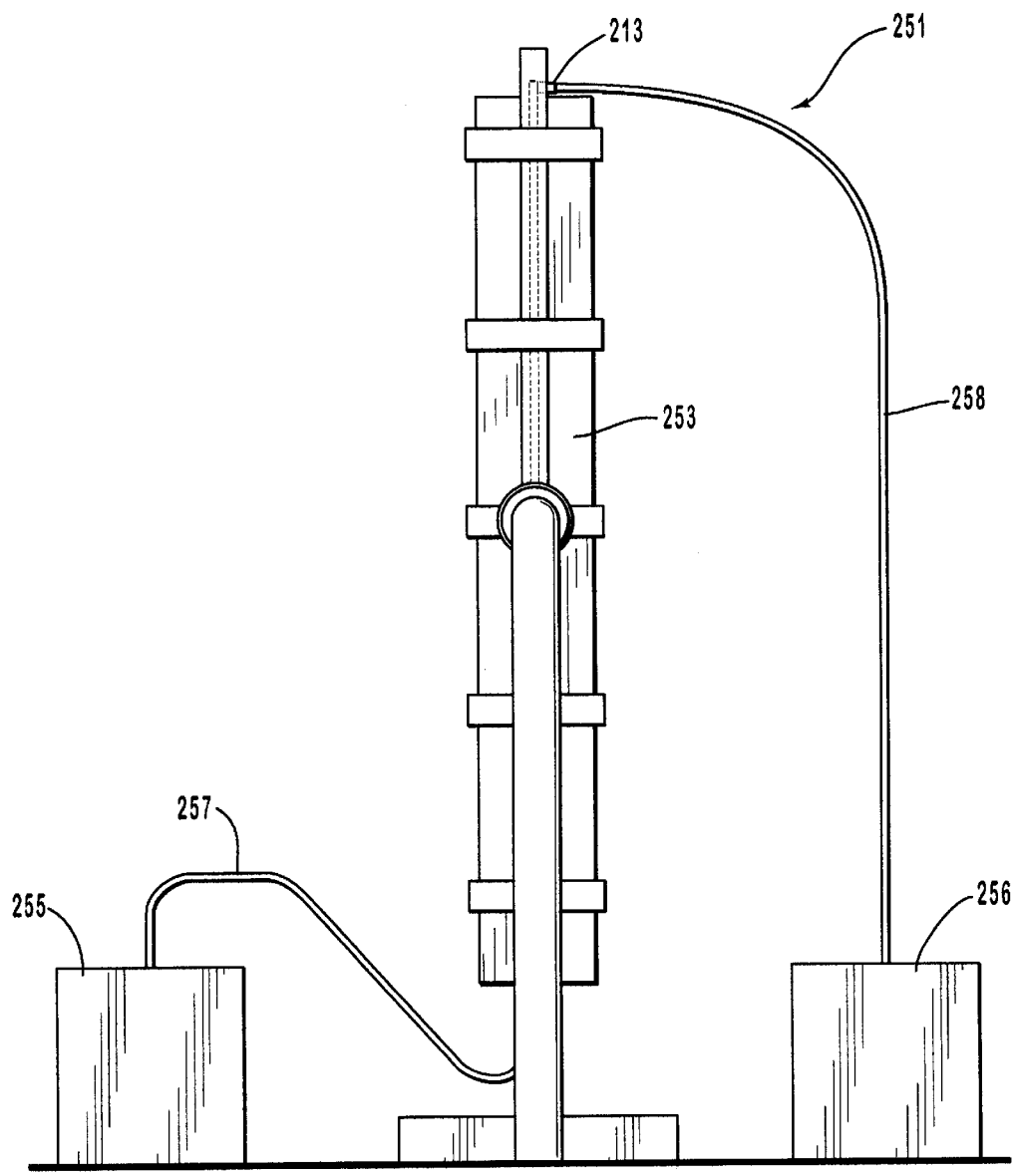
FIG. 6 is a schematic of the bladder injection molding system.

Referring to FIG. 6, which is a schematic of the bladder molding apparatus 251, the mold 201 is placed vertically, with the injection port 211 down, to prevent the weight of the mandrel from displacing it from the center. The mold is clamped closed against the molding pressure by any suitable clamping system, such as a "fire-hose" clamp 253 as illustrated. The mold is degassed through the vacuum port 213, using a vacuum pump 256 applied through vacuum line 258. An injection pump 255 of conventional design is used to inject a curable liquid polymeric thermosetting resin though injection line 257, which fills the cavities of the mold. Any suitable injection pump may be used, such as, for example, FLOWARE™ Model RTM-2100 available from Radius Engineering, Salt Lake City, Utah. A suitable injection pressure is about 120 psig.

The injection is continued until the mold is filled and the resin begins to leave the mold through vacuum port 213, which is then clamped. The mold is then heated at a sufficient temperature and period of time to cure the resin. The cured resin is elastomeric and preferably has heat resistant properties, so that when it is used in the shaft molding process it will retain its integrity and be used more than once. A suitable resin is RTV Silicone, such Rodorsil 1556™, and is cured at about 200° F. for about one hour. Before injection the resin is mixed with a suitable catalyst. For Rotorsil, a suitable catalyst is mixed at a ratio of resin to catalyst of 10:1.

The mold 201 is allowed to cool, the mold unclamped and removed from the molding apparatus. The tension on the mandrel is released by unclamping the distal end of the mandrel from the clamp 221.

The mandrel 217 covered by the cured bladder 260 is then demolded from the mold 201. The bladder mandrel 217 is then removed from the bladder 260. The mandrel 217 is tapered from the proximal end to the distal end to aid in removal.

Figure 7:
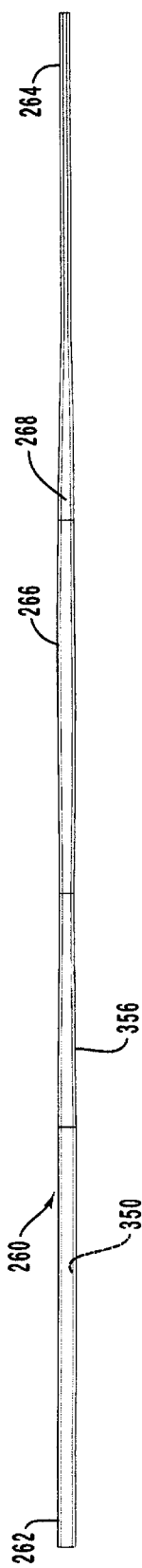
FIG. 7 is a cross-section of the bladder along the longitudinal axis.
Figure 8:
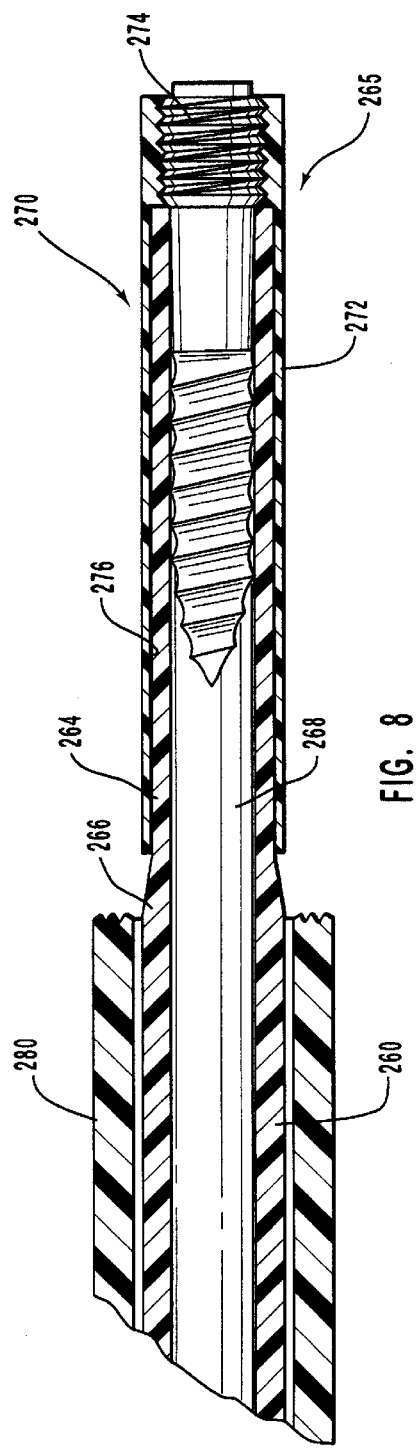
FIG. 8 is an illustration of the seal at the end of the bladder.

Referring to FIG. 7, which is a cross-section of the bladder 260, the bladder is generally tubular with a proximate end 262, distal end 264, and bladder wall 266 surrounding an internal cavity 268. The internal dimension, i.e., the thickness of the wall and the outer dimensions of the bladder, is determined by the dimensions of the mold cavity and bladder mandrel, which varies along the length of the bladder. The dimensions of the bladder are described in greater detail below. Since bladder as molded is tubular in nature with an opening at each end, to create an inflatable bladder with only one opening for inflation the opening at the distal end 264 is sealed by seal 270. Referring to FIG. 8 showing the seal 270 the bladder at the distal end 264 has distal opening 265 into the bladder cavity 268. The opening is sealed by a steel sleeve 272 over the distal end 264 of the bladder 260 with a tapered screw 274 the screws into the cavity opening 265. As the screw is turned into the cavity opening 265, the taper of the thread clamps the walls of the bladder against the inner surface of the sleeve 276, thereby, sealing the end of the bladder 264.

Manufacture of the Composite Shaft

Figure 9:
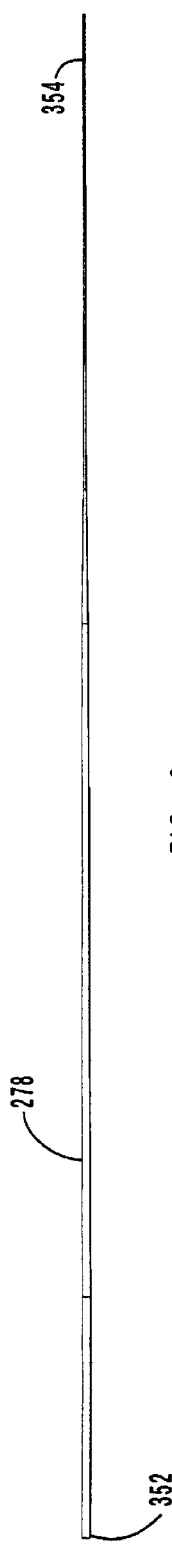
FIG. 9 is a cross-section of the rolling mandrel, i.e., internal rigid mandrel inserted in bladder for preform construction.

Referring to FIG. 9, a rolling mandrel 278, which is similar to the mandrel 217 used to form the bladder 260, the dimensions being slightly smaller to account for shrinkage, is used to roll an uncured fiber-reinforced material (prepreg) 280 over the bladder. The rolling mandrel 278 is inserted into the cavity of the bladder 268, and air trapped in the bladder gently squeezed out. Prepreg material 280 is then wrapped around the bladder 260 using a heated table to keep the prepreg flexible. Suitable prepreg materials include any suitable thermosetting and thermoplastic materials used for forming fiber-reinforced composites.

The prepreg is rolled over the mandrel/bladder 278, 280 assembly by any suitable method, such as rolling tables, or heating tables, or the like. As an example, a heating of neoprene rubber covered with silicone rubber, and is set at a temperature of 110° F. may be used. The table may be contoured to match the profile of the mandrel, i.e., padded up at the waist, to assist the rolling.

Figure 11:
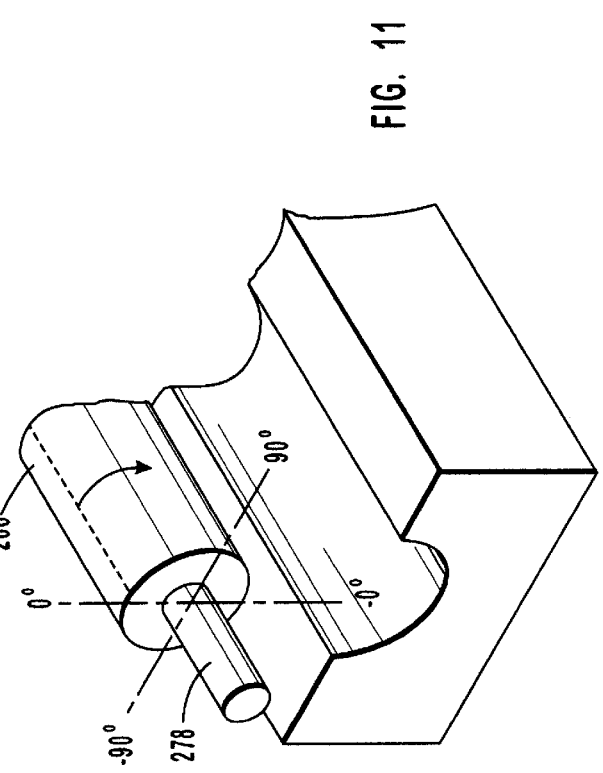
FIG. 11 is a schematic of the mandrel and mold showing the reference for the wrapping of the plies.
Figure 12:
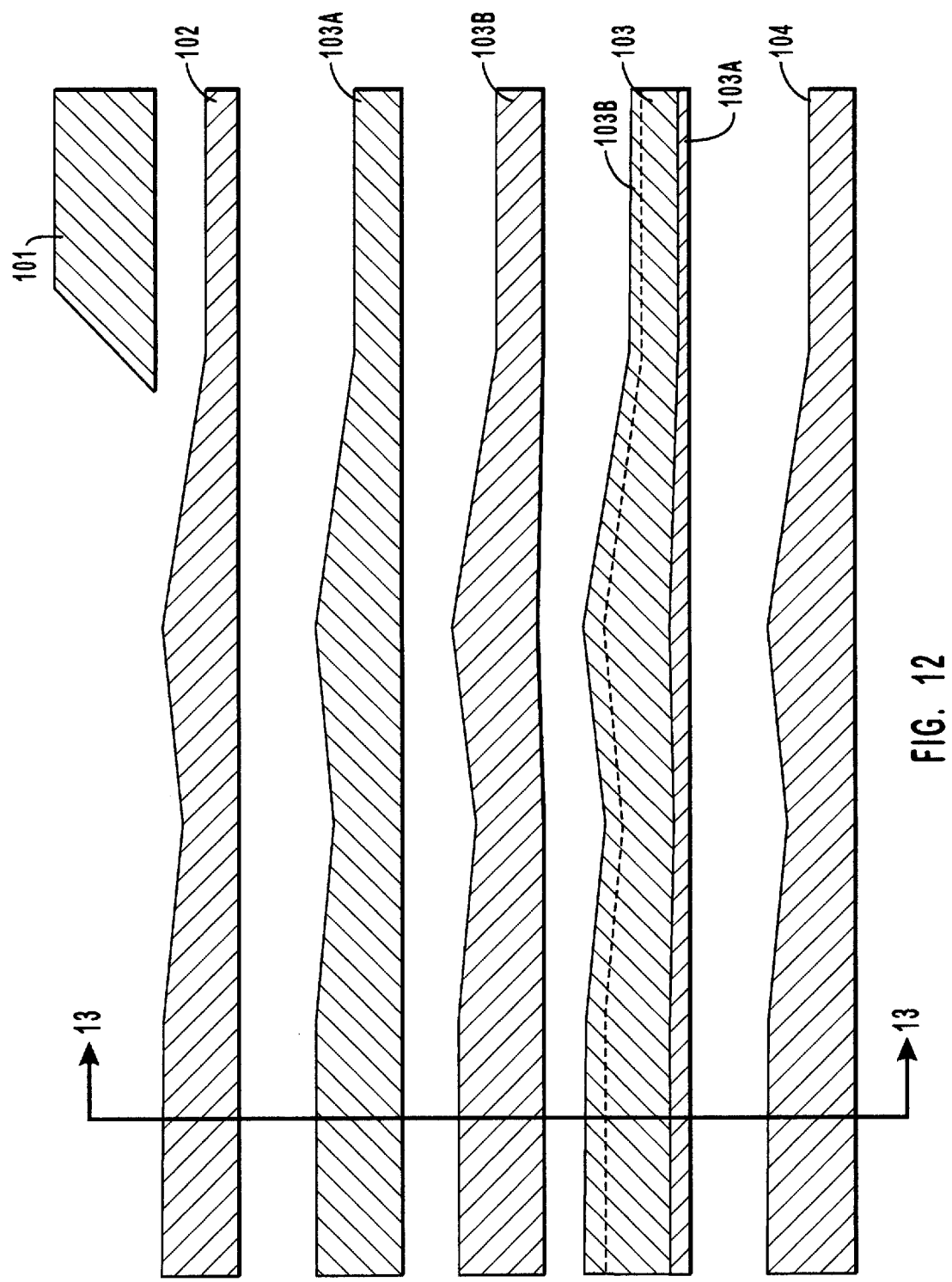
FIGS. 12 are illustration of the plies of prepreg, flat before they are rolled upon the bladder.

Before the plies are rolled upon the bladder, the bladder is treated with a suitable rubber shield protectant, such as McLube 929™ from McGee Industries or Zyvax Rubbashield™, to prevent resin from adhering to the bladder. The first ply 101, which is rolled first does not extend the full length of the shaft, and essentially provides tip reinforcement with plies at 0° to the axis of the shaft. Referring to FIG. 11, which shows the reference for wrapping the plies, the plies are wrapped in the positive direction, as shown by arrow. The first ply, illustrated flat as 101 in FIG. 12 is placed on the table and the starting point (the 0° reference point) of the first ply is marked on the bladder for the reference. The second ply 102 extends the full length of the part, and has fiber orientation 0°. Using the marked reference the second ply is started at −45° (behind the start of the first ply).

The third ply 103 is actually a double ply. The third ply 103 is prepared by placing Ply 103A over Ply 103B in an overlapping configuration as shown. The combined third ply 103 is then rolled over the first and second ply, starting at the 0° reference. The two components of the third ply 103A and 103B have a fiber orientation of +45° and −45°, respectively.

The forth ply 104 with a fiber orientation of 0° is rolled over the preceding plies staring at 135°.

Figure 13:
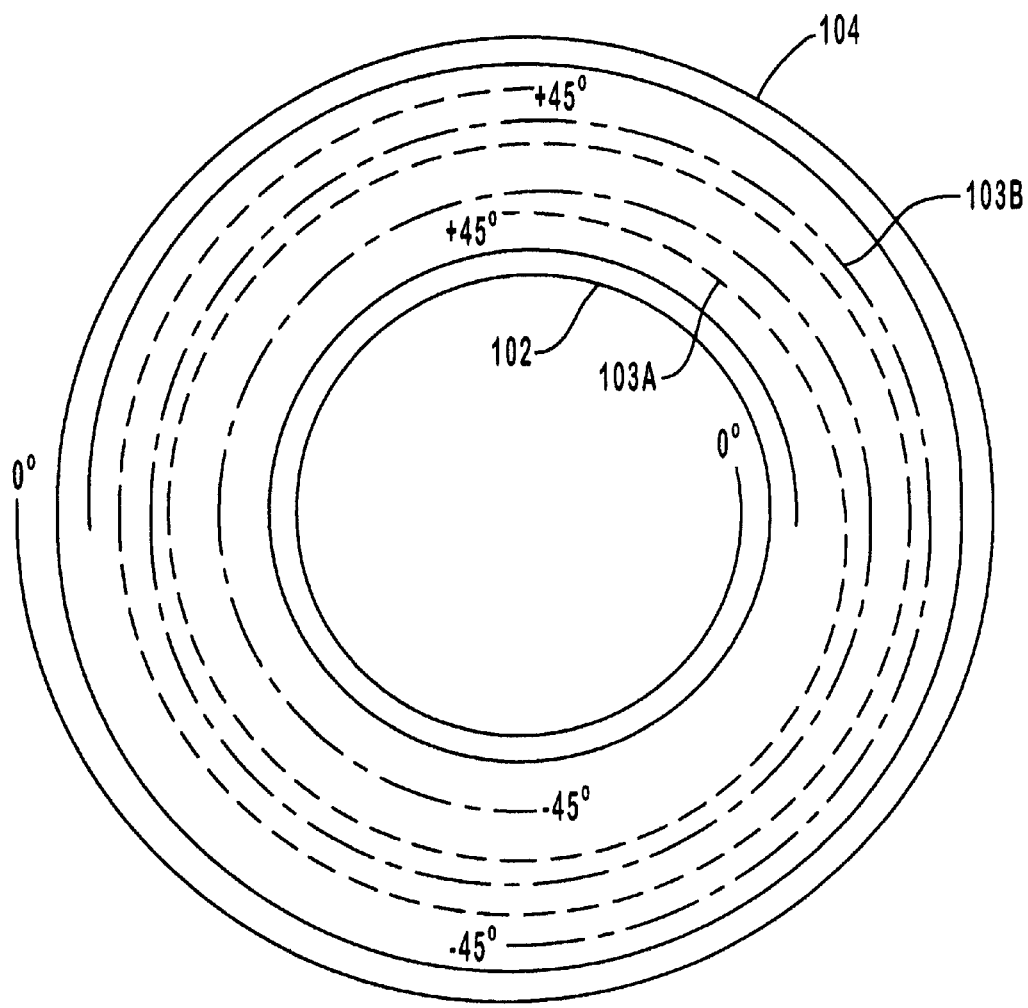
FIG. 13 is a cross-sectional diagram showing the radial location and relative position of the plies.

The plies are shaped and dimensioned such that they will wrap around the bladder twice, although more layers can be laid by making the plies wider and wrapping more than one circumference, or one layer or less than one layer by narrowing the plies. A wide range of shapes and rolling sequences can be used. FIG. 13 shows a shaft cross-section with the plies separated to better illustrate the wrapping arrangement. Shown are plies 101, 102, 103A, 103B, and 104. The shapes are also adjusted to allow the plies to wrap smoothly, to "tuck" at the tapers and the transitions of the part. For example, the bottom edge of ply 103B is not perfectly straight but is slightly concave. Other ply arrangements and fiber orientations are also contemplated to achieve a shaft that is essentially radially symmetric in properties.

After the plies have been wrapped, the mandrel 278 in the bladder 260 is removed and the assembly of the bladder 260 and the prepreg preform 282 is placed in mold bottom half 204. Alternately, the assembly may be stored and an inventory built up before the curing step.

Figure 10:
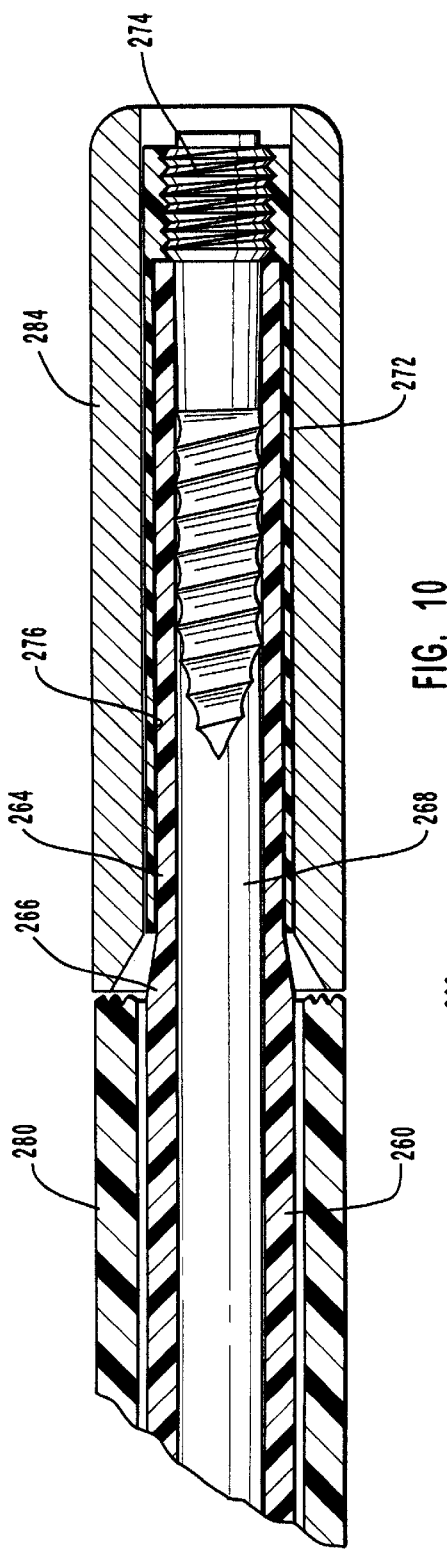
FIG. 10 is an illustration of the TEFLON sleeve placed over the seal at the end of the bladder during shaft molding.

Referring to FIG. 10, showing the end of the bladder/mandrel assembly in cross-section, before the ply is cured, a polytetrfluroethylene (TEFLON™) sleeve 284 is placed over the steel sleeve 272 of the tip seal 270 at the distal end 264 of the bladder 260 to prevent the molded part from adhering to the steel sleeve 272.

Figure 15A:
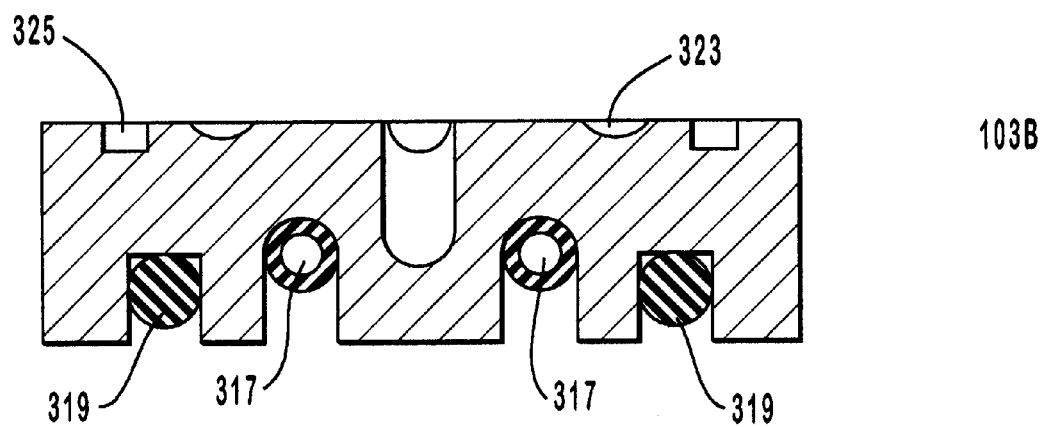
FIGS. 15A to 15B are cross-sectional views of the molding tool show in FIG. 14A to 14F.
Figure 15B:
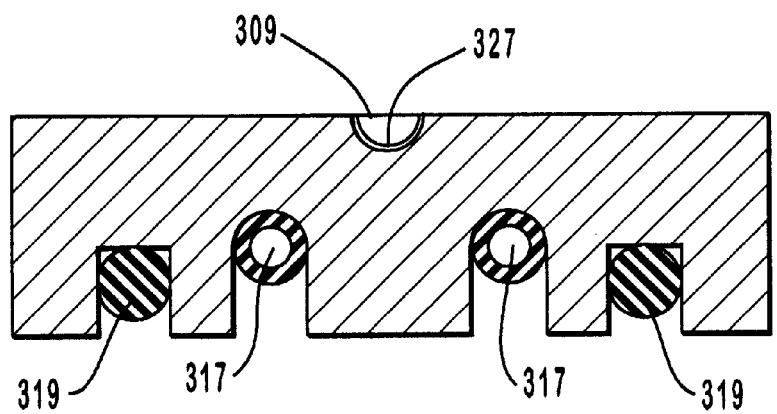

Referring to FIGS. 14A to 14D, the mold 301, which is of a suitable material, such as steel or aluminum, comprises a top mold half 303 (FIGS. 14A–B) and a bottom mold half 305 (FIG. 14C–D). In the top section 303, is half of the main cavity 307 and connecting cavities 309 to a vacuum port 311 connected to a vacuum line 313. Referring also to the cross-sectional view in FIG. 15B, the top section 303 includes, channels 315 in the outer surface to accommodate water cooling tubes 317 and heating rods 319. The cooling tubes 317 are copper tubes conveying cooling water. The heating rods 319 are conventional resistance heating rods for heating the mold.

The bottom section 305 comprises bottom portion of main cavity 307, flash cavity 323, and O-ring groove 325. The bottom section also includes a bladder pressurizing port 321, bladder pressurizing line 322, and barb connector 323 for connection to a bladder. Suitable cavities 327 are provided to accommodate the pressure port and connector 321, 323. Referring also to the cross-section in FIG. 15A, the bottom section also comprises cooling tubes 317 and heating bars 319. The bladder pressurizing line 322 is pressure sealed to the mold bottom 305 with a compression type fitting 328.

Referring to FIG. 16, the assembly of prepreg and bladder is placed into the mold bottom section 305, the TEFLON sleeve is placed at the distal end of the mold, and the proximate end of the bladder is fitted over a barbed fitting 323 which communicates with the pressure port 321 by a conduit 322. At the proximal end of the bladder where it fits over the barbed fitting 323 is a silicone tape ring 261 that serves provide local clamping of the bladder 260 onto the barbed fitting.

Figure 17:
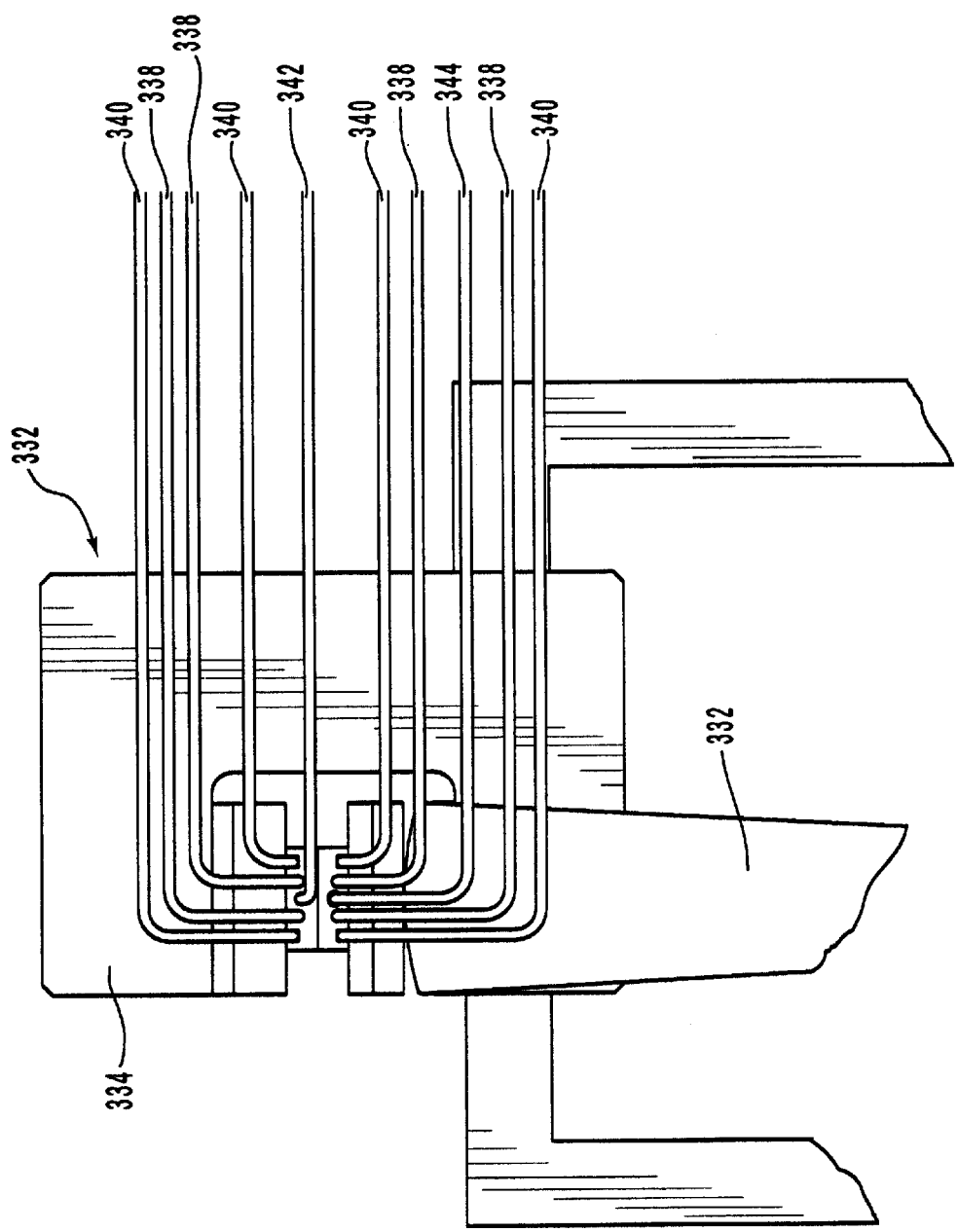
FIG. 17 is a schematic of the molding tool inside the clamping press.

The mold is placed in a molding apparatus 332. Known molding systems are suitable. Such an apparatus 332 is shown schematically in FIG. 17. The apparatus 332 comprises a clamping system, to hold the mold halves together against pressurization of the bladder, a control system which provides power for the heaters, vacuum for the mold cavity, bladder pressurization lines, and water for mold cooling.

The mold apparatus 332 shown uses a pneumatically actuated clamping system comprising a pressurizable "fire" hose 336, which is inflated to squeeze the mold halves together. The mold water cooling lines 338, mold electrical heating rod lines 340, mold cavity vacuum line 342, bladder pressurization line 344, are connected to the control system.

Figures 18, 19:
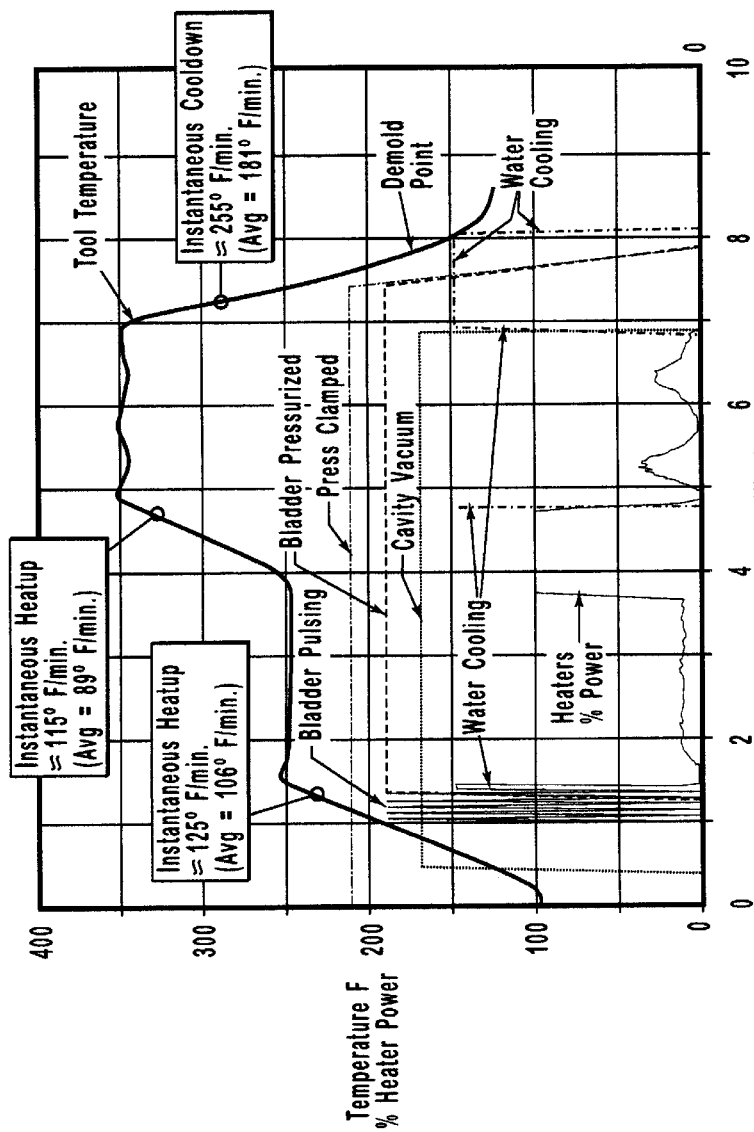
FIG. 18 is a cure profile diagram showing the cure variables during the curing cycle.
FIG. 19 are cross-section views of the molded part shaft.

Referring to FIG. 18, which is a profile graph of the cure conditions and is mostly self explanatory. The bladder was pressurized by first pulsing the bladder and then maintaining the pressure at a fixed pressure.

After the mold is unclamped the assembly of the cured part 346 and the bladder 260 is removed, by removing the top of the mold 303 and disconnecting the bladder 260 at the barbed fitting 323. The TEFLON sleeve 284 is removed and the bladder 260 removed by pulling it out through the proximal end of the cured part 348. FIG. 19 shows a cross-section of the cured part. The part is round, but varies in diameter along its length.

Figure 20:
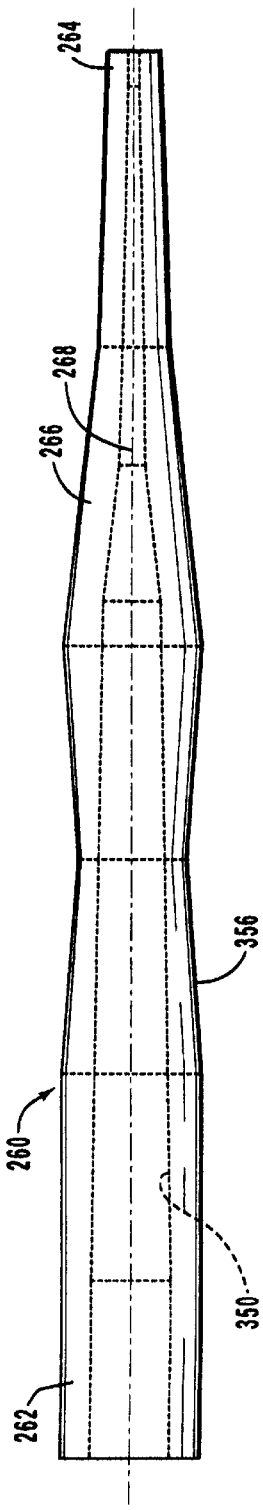
FIGS. 20 to 22 are the same as the cross-section views of the bladder (FIG. 6), the rolling mandrel (FIG. 8), and the molded part (FIG. 18), respectively, except the y-dimension has been expanded by the factor of ten to better illustrate the variations in the diameter.
Figure 21:
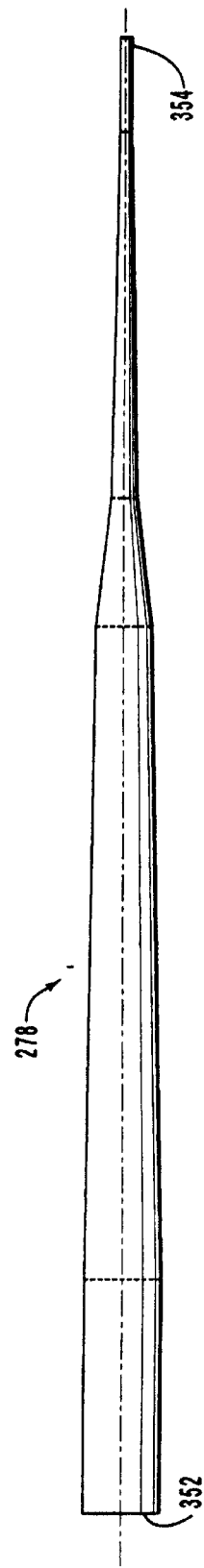
Figure 22:
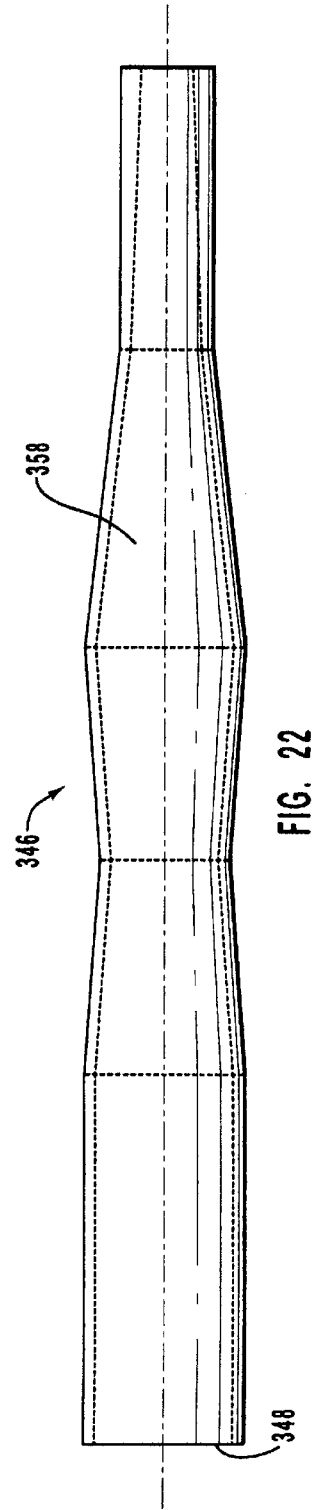

Referring to FIGS. 20 to 22, showing the cross-sections of the rolling mandrel 278, the bladder 260 and the finished part 249, as in FIGS. 9, 8, and 19, respectively, but with the radial dimension expanded by a factor of 10 to more clearly show the variations in the diameter. The mandrel 278, with outer dimensions the essentially as the inner diameter of the bladder 260, maintains the shape of the bladder during the wrapping of the plies 280. The inner dimensions of the bladder 350 and taper of the mandrel are also designed to enable removal of the mandrel after wrapping, i.e., with the taper from a large diameter at the proximal end 352 to the small diameter at the distal end 354. The outer dimensions of the bladder 356 correspond generally to the final inside dimensions of the part 358. Basically, the outer dimensions of the bladder 356 are as close to the inner dimensions of the part 358 as is practical, considering that the bladder 260 is wrapped as tightly as possible before the cure, and the assembly of the bladder 260 and prepreg preform must be placed in the mold 301, allowing closure of the mold 301 without pinching any of the plies 280 between the mold halves 301. In general practice, for shafts with having a wall thickness of about 30 to 40 thousands of an inch, the outer dimensions of the bladder are about ⅓ or 10 to 20 thousands of an inch less than the final inner dimensions of the shaft. The finished part can then be trimmed to suitable length (between 0.25 and 1.5 inches) at the ends and fitted with suitable grips and club heads in a conventional manner to make a golf shaft. In the illustrated example in FIGS. 19 and 22, the shaft starts with a grip section of a constant diameter at the grip end of about 0.585 inches, tapers down in a first body section to about 0.490 inches to form a waist, tapers in a second body section to a larger diameter of 0.585, and tapers to 0.336 in a tip section. The lengths of the grip, first, second, third, and tip sections are about 10, 7.5, 7.5, and 20 inches, respectively.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A pressurizable bladder for the manufacture of a composite shaft having a complex shape, the bladder comprising a flexible elastomeric material and adapted for supporting at least one layer of fiber impregnated with resin, the bladder comprising an opening for pressurization of the bladder to compress the impregnated fiber against female tooling corresponding to the complex shape while the tooling is heated to cure the resin, the bladder having a wall of variable outer diameter with diameter variations corresponding with inside diameter variations in the shaft to permit outer contours of the bladder to conform with inner contours of the shaft having the complex shape, the complex shape comprising a middle portion of the shaft having a diameter larger than both adjacent portions above and below the middle portion.

2. The bladder of claim 1 wherein the opening communicates with a cavity has an inside diameter that tapers from a larger diameter at a proximal end and to a smaller diameter at a distal end with the walls of the bladder having a variable thickness to provide the complex shape.

3. The bladder of claim 1 wherein the bladder is an injection molded bladder.

4. The bladder of claim 3 wherein the flexible elastomeric material comprises a sllicone.

5. The bladder of claim 1 wherein a rigidizer is used to support the bladder for application of the resin impregnated fiber, which rigidizer is removed during pressurization of the bladder to compress the impregnated fiber against the female tooling.

6. The bladder of claim 3 wherein a rigidizer is used to support the bladder to assist application of the resin impregnated fiber, which rigidizer is removed during pressurization of the bladder to compress the impregnated fiber against the female tooling, and wherein the rigidizer is a mandrel that extends through a portion of the cavity of the bladder.

7. A pressurizable bladder for the manufacture of a composite shaft having a complex shape, the bladder comprising a flexible elastomeric material and adapted to provide the sole internal support for at least one layer of fiber impregnated with resin while in female tooling, the bladder comprising an opening for pressurization of the bladder to compress the impregnated fiber against the female tooling corresponding to the complex shape while the tooling is heated to cure the resin, the bladder having a wall of variable outer diameter with diameter variations corresponding with inside diameter variations in the shaft to permit outer contours of the bladder to conform to inner contours of the shaft having the complex shape, the complex shape comprising a middle portion of the shaft having a diameter larger than both adjacent portions above and below the middle portion.

8. A pressurizable bladder for the manufacture of a composite shaft having a complex shape, the bladder comprising a flexible elastomeric material and adapted for supporting at least one layer of fiber impregnated with resin, the bladder comprising an opening for pressurization of the bladder to compress the impregnated fiber against female tooling corresponding to the complex shape while the tooling is heated to cure the resin, the bladder having a wall of variable outer diameter with diameter variations corresponding with inside diameter variations in the shaft to permit outer contours of the bladder to conform with inner contours of the shaft having the complex shape, the complex shape comprising a middle portion of the shaft having a diameter smaller than both adjacent portions above and below the middle portion.

9. A pressurizable bladder for the manufacture of a composite shaft having a complex shape, the bladder comprising a flexible elastomeric material and adapted to provide the sole internal support for at least one layer of fiber impregnated with resin while in female tooling, the bladder comprising an opening for pressurization of the bladder to compress the impregnated fiber against the female tooling corresponding to the complex shape while the tooling is heated to cure the resin, the bladder having a wall of variable outer diameter with diameter variations corresponding with inside diameter variations in the shaft to permit outer contours of the bladder to conform to inner contours of the shaft having the complex shape, the complex shape comprising a middle portion of the shaft having a diameter smaller than both adjacent portions above and below the middle portion.

* * * * *